Dec. 1, 1942.   J. W. ORCUTT ET AL   2,304,049
PHOTOGRAPHIC APPARATUS
Filed May 4, 1940   2 Sheets-Sheet 1

JOSEPH W. ORCUTT and
WILLIAM RABKIN   Inventors

By Edwin Levisohn
          Attorney

Dec. 1, 1942.  J. W. ORCUTT ET AL  2,304,049
PHOTOGRAPHIC APPARATUS
Filed May 4, 1940   2 Sheets-Sheet 2
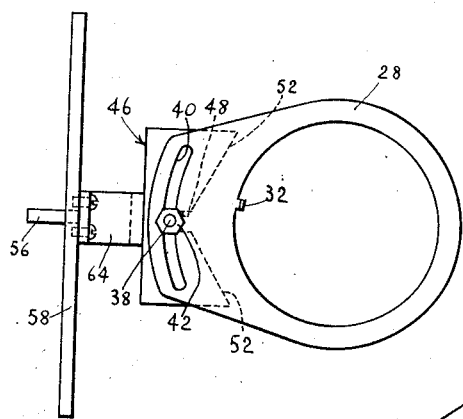
Fig. 6
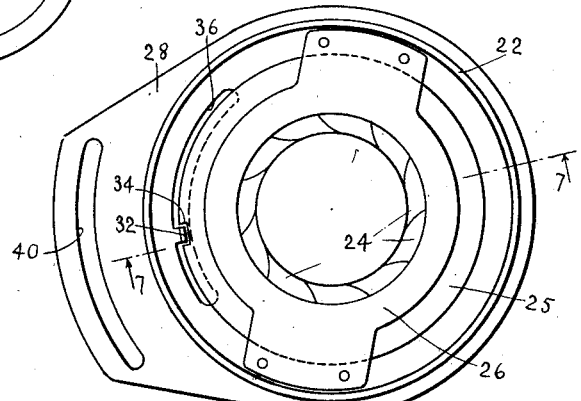
Fig. 5
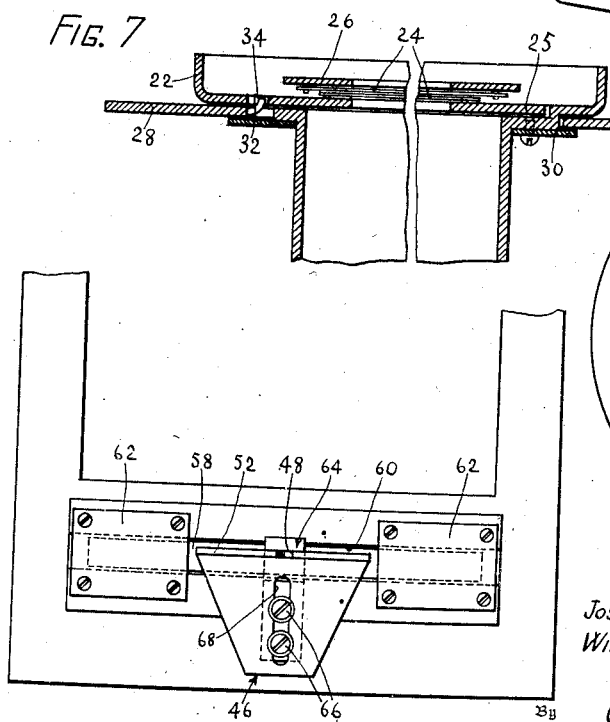
Fig. 7
Fig. 8
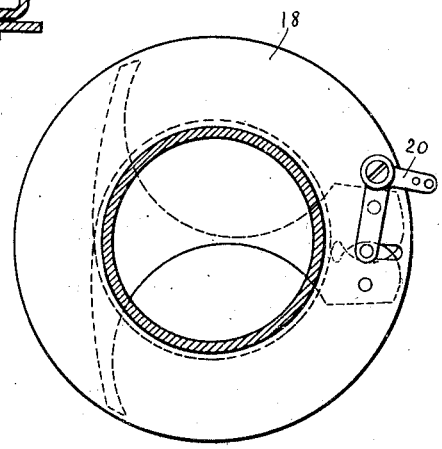
Fig. 9
Joseph W. Orcutt and
William Rabkin   Inventors
Edwin Levisohn
Attorney Patented Dec. 1, 1942

2,304,049

UNITED STATES PATENT OFFICE 2,304,049

PHOTOGRAPHIC APPARATUS

Joseph W. Orcutt, Los Angeles, Calif., and William Rabkin, New York, N. Y., assignors to International Mutoscope Reel Co. Inc., Long Island City, N. Y., a corporation of New York Application May 4, 1940, Serial No. 333,294

10 Claims. (Cl. 95—64)

This invention relates to photographic apparatus and, more particularly, to means for adjusting the iris or other light-regulating diaphragm of the camera of such apparatus.

One object of the invention is to provide a photographic apparatus including a cabinet, in which the camera is positioned, with means accessible at the front of the cabinet for adjusting the aperture-diaphragm or iris of the camera for regulating the passage of light into the camera, whereby to obtain a darker or lighter picture of the subject as may be desired by and under the control of the latter. In accordance with one of the applications of the present invention, the adjusting means is provided in the photographic apparatus disclosed in United States Letters Patent No. 2,192,755, granted March 5, 1940, to William Rabkin, and more particularly, the photographic apparatus shown in said patent is provided with means accessible at the front of the cabinet for adjusting the diaphragm-aperture or iris of the camera which is located within the cabinet, whereby the person to be photographed can readily regulate the lightness or darkness of the picture to suit his or her preference.

An object of the invention in reference to the application of the latter to photographic machines of the type disclosed in said patent is to organize the diaphragm-adjusting means in relation to the pivoted closure or frame member of the cabinet within which the camera is mounted in such manner that although the adjusting means is accessible at the front of said closure or frame member, the latter can be moved to open and closed positions without the necessity for detaching the adjusting device. This is accomplished in accordance with the present invention by including in the adjusting device a part carried by and movable with the cabinet closure or frame member in conjunction with a part mounted independently of the closure or frame member, said parts being constructed and arranged so that the first mentioned part of the adjusting device is automatically engaged with and disengaged from its companion part when the closure or frame member is moved to closed and open positions, respectively.

The above-mentioned objects of the invention and other objects not hereinbefore specifically referred to will be fully understood from the following description, reference being had to the accompanying illustrative drawings.

In the drawings:

Fig. 5 is a view, on a larger scale, on the line 5—5 of Fig. 3;

Fig. 6 is a plan view of parts of the adjusting means removed from the camera and from the frame member;

Fig. 7 is a sectional view, partly broken away, on the line 7—7 of Fig. 5;

Fig. 8 is a rear view of part of the frame member showing parts of the adjusting means mounted thereon;

Fig. 9 is a view of the camera shutter frame on the line 9—9 of Fig. 3.

Figure 1:
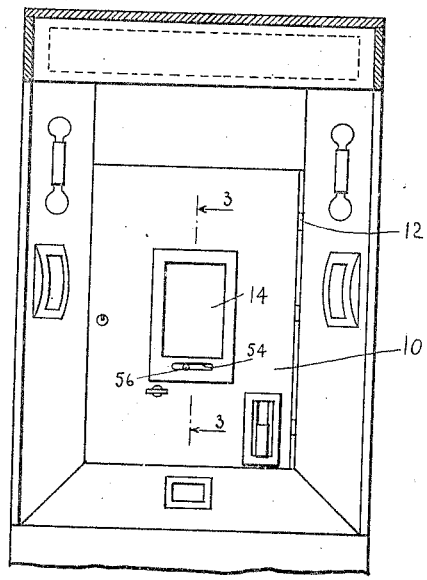
Fig. 1 is a front view, partly in elevation and partly in section, of part of the cabinet of an automatic photographic apparatus, and is similar to Fig. 2 of the above mentioned patent.
Figure 3:
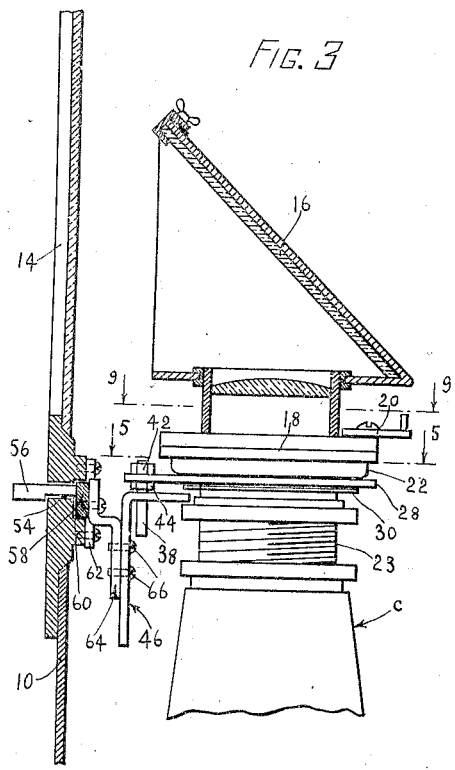
Fig. 3 is a sectional view, on a larger scale, on the line 3—3 of Fig. 1.

As illustrated in Fig. 1, the cabinet of the photographic apparatus which embodies the present invention comprises a closure or frame member 10 pivotally mounted or hinged as indicated at 12 and provided with a glass covered opening 14 providing a light passage which is registered with the camera C by the mirror 16, said camera being mounted within the cabinet behind frame member 10. As shown, said camera is provided with a shutter frame 18 in which the usual shutter plates are pivotally mounted for operation by the lever 20 actuated preferably by the mechanisms illustrated in said Patent No. 2,192,755. Said camera is also provided with an aperture-diaphragm or iris for regulating the passage of light into the camera when the shutter is opened in the operation of the camera. Said diaphragm is disposed within a ring member 22 fixed on the lens tube 23 as clearly shown in Figs. 5 and 7. The pivoted diaphragm blades 24 are pivotally connected to the apertured plate 25 which is turnably mounted in member 22 and to the stationary plate 26 which is pivotally connected to said diaphragm blades, the arrangement being such that as in the conventional adjustable diaphragm blades 24 are operated to adjust the size of the aperture by turning movement of plate 25.

The means for adjusting the diaphragm comprises a member 28 turnably mounted on the lens tube of the camera and supported by a ring 30 fixed to said lens tube as clearly shown in Fig. 7. Member 28 is provided with an upwardly bent finger 32 which engages blade adjusting plate 25 in a recess 34. Mounting member 22 is provided with an arcuate slot 36 to permit movement of finger 34 of plate member 28. A pin 38 is adjustably secured to member 28 in a slot 40 provided therein, said adjustable securement being provided by nuts 42 and 44 which are threaded on the upper end of said pin and releasably engage opposite sides of plate member 28.

The adjusting means includes a member 46 slidably mounted on frame member 10 and movable with the latter. Said member is provided with an opening 48 in which pin 38 is engaged when the parts of the adjusting means are in operative position. Said opening 48 communicates with a larger opening 50 defined by edges 52 which diverge from each other in a direction from the frame member 10 toward the camera, whereby upon movement of frame member 10 to open and closed positions part 46 of the adjusting device is automatically disengaged from and engaged with adjusting part 28 and more specifically with pin 38 which is secured to the latter. It will be understood that in closing frame member 10 one or the other of edges 52 of part 46 engage pin 38 and direct the latter into opening 48 of adjusting part 46.

As hereinbefore indicated an important feature of the present invention resides in providing means accessible at the front of the cabinet for adjusting the diaphragm-aperture or iris of the cabinet. For this purpose as here shown frame 10 is provided with a slot 54 in which a pin member 56 is movable, projecting through said slot forwardly of frame 10 in position to be manipulated by the person whose picture is taken. Said pin is fixed to and projects forwardly of a bar 58 slidably mounted at the rear of frame 10 in a guide groove 60, plates 62 being provided for releasably holding bar 58 in said groove. A bracket 64 is secured to bar 58 and to member 46 by screws 66 which engage said member adjustably in a slot 68 provided therein.

Figure 2:
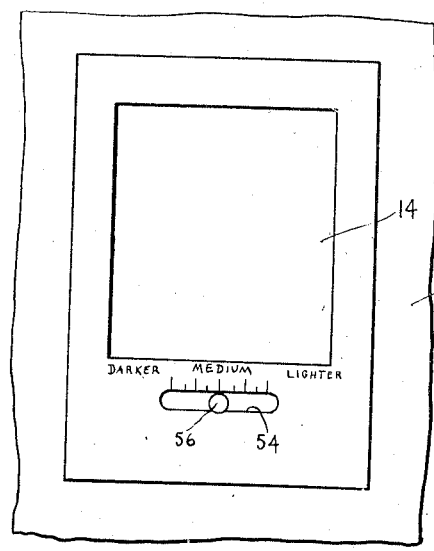
Fig. 2 is a view, on a larger scale, of part of the frame member of the cabinet illustrated in Fig. 1.
Figure 4:
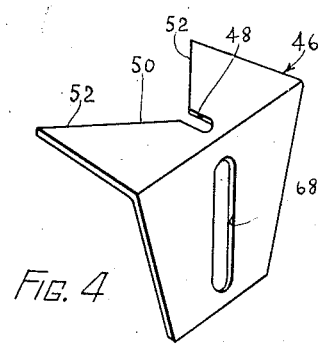
Fig. 4 is a perspective view of a part of the adjusting means.

As illustrated in Fig. 2 the frame member 10 is provided with suitable legends adjacent slot 54 to indicate the direction and extent of movement of pin 56 for adjusting the diaphragm for a darker or lighter picture. It will be understood that pin 38 is initially adjusted in slot 40 of member 28 so that when pin 56 is centrally positioned in slot 54 a picture of average character as to lightness or darkness will be produced when the photographic machine is operated, and that if a darker or lighter picture is desired pin 56 is moved in the proper direction to the extent desired by the person whose picture is taken.

Thus it is seen that by the adjusting means herein disclosed provision is made for accomplishing the objects of the invention. It will be observed that the adjusting means is operatively connected to the diaphragm and is accessible at the front of the frame member of the cabinet for adjusting said diaphragm, and that said means comprises companion parts engageable with and disengageable from each other automatically when the frame member is moved to closed and open positions. Accordingly, frame member 10 can be opened to provide access to the interior of the cabinet without requiring dismounting of any of the parts of the adjusting means and that when the frame member is moved to closed position the parts of the adjusting means are automatically associated in operative relation. Other features and advantages of the mechanism herein disclosed will likewise be apparent. It will be understood, however, that while we have shown and described a preferred embodiment of the invention the latter may be embodied otherwise than as here shown and that certain changes in the details of construction and in the arrangement of parts of the mechanism herein illustrated or described may be made and will occur to skilled artisans, particularly in view of the present disclosure. Therefore, we do not wish to be limited to the invention as herein specifically shown or described except to the extent which may be required by the scope of the appended claims.

Having thus described our invention, what we claim and desire to secure by Letters Patent is:

1. In photographic apparatus including a camera, a cabinet frame member in front of said camera and provided with a light passage which registers with said camera for taking a picture, said frame member being mounted for movement relatively to said camera, said camera having a shutter and an adjustable aperture-diaphragm for regulating the passage of light into the camera when the shutter is opened in the operation of the camera, and means mounted on said movable frame member operatively connected to said diaphragm and accessible at the front of said frame member for adjusting said diaphragm, said last mentioned means being movable in relation to said frame member and the connection of said last mentioned means with said diaphragm including means which allows movement of said frame member in relation to the camera while the latter remains stationary.

2. In photographic apparatus including a camera, a cabinet frame member in front of said camera and provided with a light passage which registers with said camera for taking a picture, said frame member being mounted for movement relatively to said camera, said camera having an adjustable aperture-diaphragm for regulating the passage of light into the camera, means including a turnably mounted member for adjusting said diaphragm, and means including a part movably mounted on said frame member and movable therewith and operatively connected to said turnably mounted means for turning the latter for adjusting said diaphragm, the connection of said part with said turnably mounted means being releasable whereby said frame member is movable in relation to the camera while the latter remains stationary.

3. In photographic apparatus including a camera, a cabinet frame member in front of said camera and provided with a light passage which registers with said camera for taking a picture, said frame member being mounted for movement relatively to said camera, said camera having an adjustable aperture-diaphragm for regulating the passage of light into the camera, means including a turnably mounted member for adjusting said diaphragm, and means including a part movably mounted on said frame member on the interior of the cabinet, said part being movable with said frame member and operatively connected to said turnably mounted member for turning the latter for adjusting said diaphragm, the connection of said part with said turnably mounted means being releasable whereby said frame member is movable in relation to the camera while the latter remains stationary, said last mentioned means having an operating part accessible at the front of said frame member.

4. In photographic apparatus including a camera, a cabinet frame member in front of said camera and provided with a light passage which registers with said camera for taking a picture, said frame member being mounted for movement relatively to said camera, said camera having a shutter and an adjustable aperture-diaphragm for regulating the passage of light into the camera when the shutter is operated, a turnably mounted adjusting member on which said diaphragm is adjustably carried and by which said diaphragm is adjusted, a second turnably mounted member operatively connected to said adjusting member, and means operatively connected to said second turnably mounted member for operating the latter to adjust said diaphragm, said last mentioned means being movable with and respect to said frame member and the connection of said last mentioned means with said second turnably mounted member including means which allows movement of said frame member in relation to the camera while the latter remains stationary.

5. In photographic apparatus including a camera, a cabinet frame member in front of said camera and provided with a light passage which registers with said camera for taking a picture, said frame member being mounted for movement relatively to said camera, said camera having a shutter and an adjustable aperture-diaphragm for regulating the passage of light into the camera when the shutter is operated, means including a turnably mounted member for adjusting said diaphragm, said frame member having an opening therethrough, means mounted on said frame member interiorly of the cabinet and operatively connected to said turnably mounted member for adjusting said diaphragm, said last mentioned means being movable in relation to said frame member and the connection of said last mentioned means with said diaphragm including means which allows movement of said frame member in relation to the camera while the latter remains stationary, said last means including a part passing through said opening to the front of said frame member for access at the front of the cabinet.

6. In photographic apparatus including a camera, a cabinet frame member in front of said camera and provided with a light passage which registers with said camera for taking a picture, said frame member being mounted for movement relatively to said camera, said camera having an adjustable aperture-diaphragm for regulating the passage of light into the camera, said frame member having an opening therethrough, means carried by said camera for adjusting said diaphragm, means mounted on said frame member interiorly of the cabinet in movable relation thereto and operatively connected to said diaphragm-adjusting means for operating the same, said last mentioned means having a part releasably engageable with said diaphragm-adjusting means and a part projecting through said opening in the frame member to the front of the latter and movable in said opening for actuating said first mentioned part, the releasable engagement of said first mentioned part allowing movement of said frame member in relation to the camera while the latter remains stationary.

7. In photographic apparatus including a camera, a cabinet frame member in front of said camera and provided with a light passage which registers with said camera for taking a picture, said camera having an adjustable aperture-diaphragm for regulating the passage of light into the camera, a member turnably mounted on said camera and connected to said diaphragm for adjusting the latter, said frame member having a slot therethrough, a member slidably mounted at the rear of said frame member in juxtaposition to said slot and having a part projecting through said slot and movable longitudinally thereof for operation at the front of said frame member, and a part carried by said slidable member on the interior of the cabinet and operatively connected to said turnably mounted member for operating the same, the connection of said last mentioned part with said turnably mounted member including means which allows movement of said frame member in relation to the camera while the latter remains stationary.

8. In photographic apparatus including a camera, a cabinet frame member in front of said camera and provided with a light passage which registers with said camera for taking a picture, said camera having an adjustable aperture-diaphragm for regulating the passage of light into the camera, said frame member having a slot therethrough, a member slidably mounted at the rear of said frame member in juxtaposition to said slot and having a part projecting through said slot and movable longitudinally thereof for operation at the front of said frame member, a part carried by said slidable member on the interior of the cabinet and operatively connected to said diaphragm for adjusting the same, said frame member being movable in relation to said camera from closed position to open position to provide access to the interior of the cabinet, and said last mentioned part being movable with said frame member and automatically connected operatively to said adjustable diaphragm when the frame member is moved to the closed position thereof.

9. In photographic apparatus including a camera, a movable frame member provided with a light passage which registers with said camera for taking a picture, said camera having an adjustable aperture-diaphragm for regulating the passage of light into the camera, and means operatively connected to said diaphragm and accessible at the front of said frame member for adjusting said diaphragm, said last mentioned means having relatively movable engageable and disengageable companion parts, one of said last mentioned parts being movable with said pivoted frame member and automatically movable by the latter upon movement thereof toward and away from the camera into and out of engagement, respectively, with the companion part.

10. In photographic apparatus including a camera, a movable frame member provided with a light passage which registers with said camera for taking a picture, said camera having an adjustable aperture-diaphragm for regulating the passage of light into the camera, means operatively connected to said diaphragm and accessible at the front of said frame member for adjusting said diaphragm, said last mentioned means comprising a first part mounted on said camera and a second part mounted on said frame member and having an opening defined by confronting edges diverging in a direction toward the part mounted on the camera, and a pin carried by said first part engageable with said second part in said opening when said frame member is in one position, said second part being automatically engageable with and disengageable from said pin, upon movement of the frame member to and from said position, respectively.

JOSEPH W. ORCUTT.
WILLIAM RABKIN.